Aug. 20, 1963

L. STARR ETAL 3,100,986

LEAKAGE INDICATOR

Filed July 8, 1960

INVENTORS
LOUIS STARR
ALLAN L. KAPLAN
MYRON L. GREENBERG
LEWIS J. COX

BY

WILSON, SETTLE, McRAE & CRAIG
ATTORNEYS

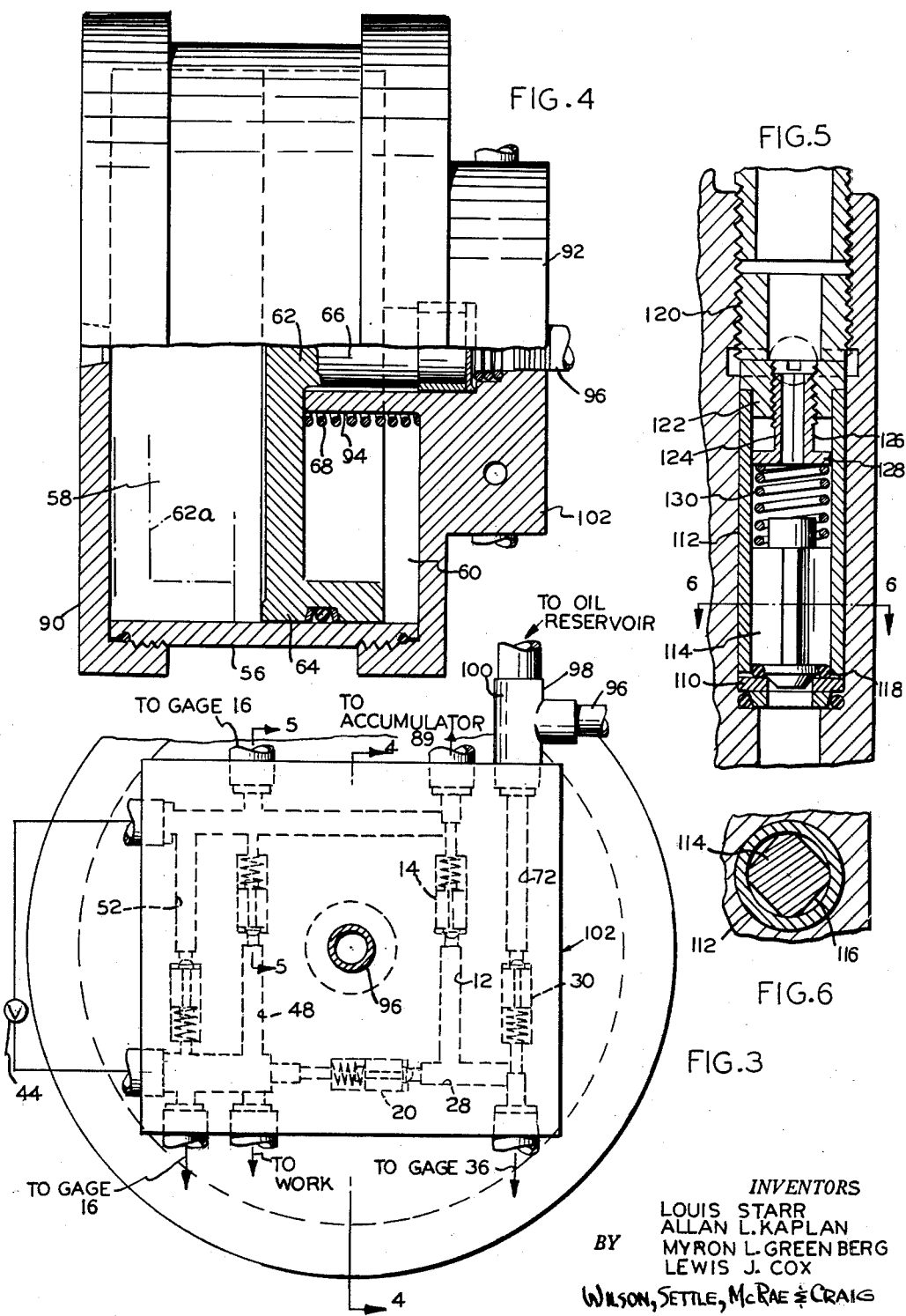

United States Patent Office 3,100,986
Patented Aug. 20, 1963

3,100,986
LEAKAGE INDICATOR
Louis Starr, Oak Park, Allan L. Kaplan, Detroit, Myron L. Greenberg, Pontiac, and Lewis J. Cox, Drayton Plains, Mich., assignors to Starr-Kap Engineering Company, Detroit, Mich., a corporation of Michigan
Filed July 8, 1960, Ser. No. 41,595
13 Claims. (Cl. 73—40)

This invention relates to mechanisms for detecting leakage in fluid devices.

One object of the invention is to provide a leakage detection mechanism having means for trapping a testing pressure in two isolated areas, applying one of the isolated pressures to the work to be tested, and directing both pressures against oppositely acting pressure surfaces in a pressure differential indicator so that any leakage in the work is caused to be recorded by the indicator.

A further object of the invention is to provide a leakage detection mechanism which is operable in a relatively high pressure range, as for example 5,000 p.s.i.

A further object of the invention is to provide a leakage detection mechanism which incorporates a pressure multiplying pump structure for permitting the mechanism to be operated by a relatively low pressure fluid, as for example the conventional compressed air supply available in most plant installations.

An additional object of the invention is to provide a leakage detection mechanism operating with hydraulic liquids without loss of substantial liquid quantities after each testing operation.

An additional object of the invention is to provide a hydraulic liquid leakage detection mechanism having a system of valves therein for containing the liquids and replenishing liquid lost during testing operations.

A further object of the invention is to provide a leakage detection mechanism having self-contained means for checking against fluid leakage within the mechanism itself.

Another object of the invention is to provide a leakage detection mechanism which may be constructed at relatively low cost.

A further object is to provide a leakage detection mechanism having a relatively small number of joints subject to leakage.

Another object of the invention is to provide a leakage detection mechanism having a novel manifold construction for defining a series of valved passageways.

Another object of the invention is to provide a leakage detection mechanism in which sub-assemblies thereof may be replaced as complete units in the event of failure of the mechanism.

Another object of the invention is to provide a leakage detection mechanism which may be built as a relatively compact, easily transported device.

Other objects of this invention will appear in the following description and appended claims, reference being had to the accompanying drawings forming a part of this specification wherein like reference characters designate corresponding parts in the several views.

In the drawings:

FIG. 3 is an end elevational view of a structure incorporating the components denoted by dotted line 10 in FIG. 1.

FIG. 4 is a sectional view taken on line 4—4 in FIG. 3.

FIG. 5 is an enlarged sectional view taken through a check valve employed in the FIG. 3 construction.

FIG. 6 is a fragmentary sectional view taken on line 6—6 in FIG. 5.

Before explaining the present invention in deail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 2:
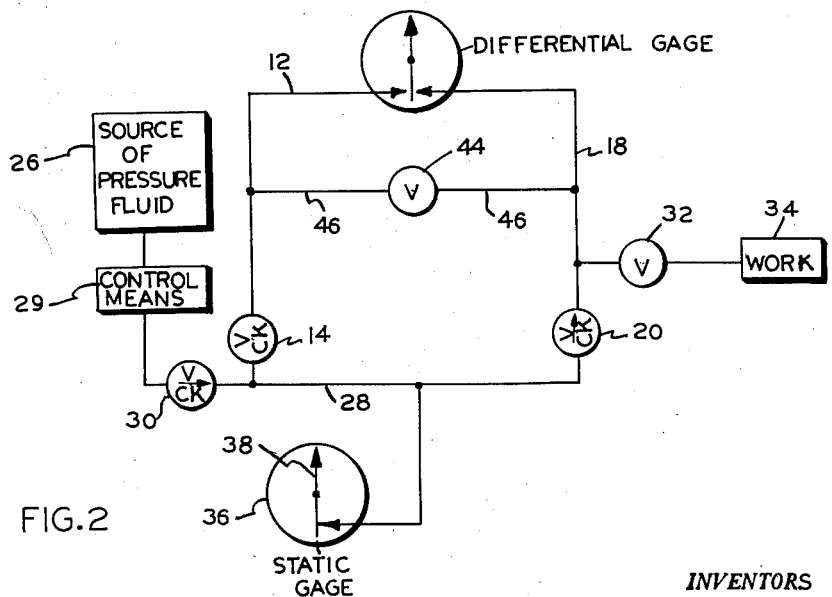
FIG. 2 is a schematic illustration of certain of the operating components of the FIG. 1 embodiment.

Referring to the drawings, and particularly FIG. 2, there is schematically illustrated a leakage detecting mechanism including a first fluid conduit 12 extending between check valve 14 and the differential pressure gage 16, and a second conduit 18 extending between check valve 20 and differential gage 16. The gage may be of conventional construction and may be operated by such pressure-responsive devices as diaphragms, bellows or Bourdon tubes; hence the gage details are not illustrated in the drawings. In the drawing the pressure-responsive operator for the gage is denoted by numeral 24 and the indicator needle therefor by numeral 22. It will be understood that operator 24 is in pressure communication with each of the lines 12 and 18, so that a pressure differential across these lines is effective on mechanism 24 to provide a deflection of the needle 22 from its illustrated zero position.

In order to supply the lines 12 and 18 with pressure fluid there may be utilized a suitable source of pressure fluid denoted in FIG. 2 by numeral 26. Said pressure source feeds fluid through control means 29 to a third conduit 28 which is suitably connected to check valves 14 and 20 at the upstream ends of lines 12 and 18. A third check valve 30 prevents back flow from conduit 28 to the pressure source 26, and a manually operated valve 32 admits pressure fluid from line 18 to the work to be tested, herein designated by numeral 34. A static pressure gage 36 is placed in fluid communication with conduit 28 so that the needle 38 thereof is effective to record the absolute pressure existing in the system at initiation of the testing operation. The testing mechanism may be utilized in any desired pressure range, as for example 2,000 p.s.i., 4,000 p.s.i. or 5,000 p.s.i., the control means 29 being suitably operated to establish the desired pressure in the system. A line 46 and manual valve 44 are provided to facilitate the filling and exhausting of fluid from the tester.

In operation of the FIG. 2 system the testing mechanism is first connected to the work 34, after which valve 44 is opened. The control means 29 is then operated to deliver pressure fluid from source 26 into the line 28 and thence into the lines 12 and 18. It will be seen from FIG. 2 that the various checks 30, 14 and 20 are disposed to permit the desired flow. Since valve 32 is opened the pressure in conduits 28, 12 and 18 will also be transmitted to the work 34. This static pressure will be indicated by deflection of needle 38. However, there will be substantially no needle deflection of needle 22 in gage 16, since the pressure-responsive operator for this gage is subjected to the substantially equivalent opposing pressures in lines 12 and 18.

When the system is up to pressure (as denoted by needle 38) valve 44 is closed to isolated the fluid in line 12 from the remaining fluid in the system. If there is a leak in work 34 the fluid pressure in line 18 will decrease. The pressure loss will be transmitted to line 18, with a resulting reflection of needle 22. If there is no leakage in the work needle 22 will maintain its zero position.

After the leakage detecting operation is completed valve 32 may be closed and the tester mechanism disconnected from work 34. Thereafter the pressure across lines 12 and 18 may be equalized, as by opening manual valve 44 in the normally closed line 46. If desired, the tester may be drained of fluid by opening valve 32.

Figure 1:
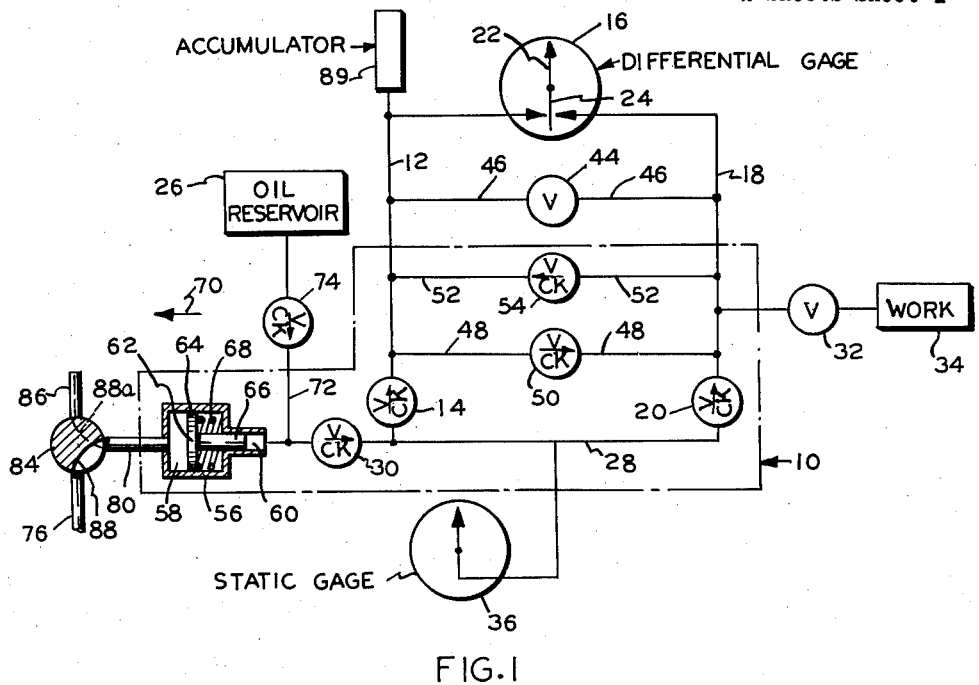
FIG. 1 is a schematic illustration of the operational features of one embodiment of the invention.

FIG. 2 illustrates the primary mechanisms of a tester constructed according to the invention, and FIG. 1 illustrates the FIG. 2 mechanisms in association with certain other mechanisms found to be useful in connection therewith. Referring to FIG. 1, the mechanism there shown is provided with a line 48 having a check valve 50 therein, and a second line 52 having a check valve 54 therein. Lines 48 and 50 function as safety lines for preventing damage to the mechanisms within indicator 16. For this purpose the springs in checks 50 and 54 are suitably loaded or adjusted so that the valves open after a predetermined pressure differential corresponding to the maximum deflection of needle 20 permitted, without damaging the gage parts. Thus, assuming in an illustrative installation that gage 16 can handle a maximum differential of 50 p.s.i. in either direction, then the springs for valves 50 and 54 are set to allow the valves to open at that differential. In the testing operation if the pressure in line 12 should be more than 50 p.s.i. above the pressure in line 18 the valve 50 will open to bring the pressure differential within the safe value. Conversely, if the pressure in line 18 should for any reason be more than 50 p.s.i. above the pressure in line 12 then check 54 would open to bring the differential within the safe range. It will be understood that these checks are normally closed, and that they do not enter into the testing function except in their capacities as safety devices.

Referring to FIG. 2 the pressure control mechanism shown therein is designated generally by the numeral 29, whereas FIG. 1 illustrates the features of arrangement which may be employed in an operative control device. Referring to FIG. 1 the pumping device may comprise a fluid cylinder 56 having a large diameter cavity 58 and a small diameter cavity 60. Cylinder 56 contains a piston means 62, which includes a large diameter piston section 64 and a small diameter piston section 66. A compression spring 68 serves to move the piston means in the arrow 70 direction. It will be seen that cavity 60 is located as part of a trap chamber or line 72 which extends between the check 74 and the previously mentioned check 30. It will thus be seen that back and forth movement of the piston means 62 is effective to pump hydraulic fluid from the liquid reservoir 26 into the conduit 28. Thus, when the piston means 62 is moved in the arrow 70 direction the liquid is drawn from reservoir 26 past the check 74 and into cavity 60. On the reverse stroke of piston means 62 the collected liquid within cavity 60 is pumped past the check 30 into line 28.

The FIG. 1 arrangement utilizes a relatively low pressure source of power for developing the pumping stroke of piston means 62, as for example the low pressure existing within the compressed air line 76. Conventionally this compressed air line would have a pressure value of perhaps 50 p.s.i., whereas the pressure developed in conduit 28 might be as high as 5,000 p.s.i. or higher. The operating air pressure is applied onto the larger piston section 64 through a line 80 which leads through a suitable filter (not shown) into the cavity 58. Line 80 defines one port of a three-way valve 84. The second port of said valve connects with a vent line 86 and the third port connects with the aforementioned compressed air line 76. In the FIG. 1 full line position 88 of the three-way valve the pressure in line 76 is applied to the cavity 58 to move the piston means 62 to the right against the action of spring 68 in a manner to pump liquid into line 28. When the rotary valve element for the valve is moved to the dotted line position 88a the pressure in cavity 58 is exhausted to the vent 86, and the spring 68 is effective to move the piston means 70 in the arrow 70 direction. During this movement liquid is drawn from reservoir 26 into the cavity 60. By again rotating the valve 84 compressed air can be admitted into cavity 58 to thereby effect a further pumping of liquid into line 28. By the manual manipulation of the rotary valve any desired amount of liquid can be pumped into the system of tester passages and into the work to be checked. As the system is filled the liquid pressure will be indicated on static gage 36. It will be noted that the effective area of piston 64 is many times the effective area of the piston 66. By this arrangement the relatively low pressure in line 76 can be utilized to develop a relatively high pressure in conduits 12, 18 and 28. If desired an accumulator 89 may be provided to compensate for valve element movements, i.e. to maintain pressure in line 12 during the testing operations.

FIGS. 3 and 4 illustrate an actual arrangement of parts which can be utilized in the formation of the components encompassed by dotted line 10 in FIG. 1. Referring to FIG. 4, there is shown a cylinder 56 having the end cap 90 carried thereon to define the cavity 58. The piston means 62 comprises the relatively large diametered section 64 and the relatively small diametered section 66. The right end of the cylinder means 56 is closed by the cap 92 which is provided with the inwardly projecting tubular section 94 defining the small diameter cavity 60. A compression spring 68 surrounds the extension 94 to return the piston means 62 to the dotted line position 62a. In the FIG. 4 construction the aforementioned line 72 is formed by the high pressure tubing 96 which connects between the cavity 60 and the fitting 98 shown best in FIG. 3. Leg 100 for fitting 98 is adapted to connect with a line leading from a suitable liquid reservoir 26 (not shown in FIG. 3). As indicated by FIG. 1, the liquid reservoir is preferably provided with a check valve 74 to permit the liquid to be drawn from the reservoir, but to prevent same from returning on the development of pumping pressure.

Fitting 98 is threaded into a recess in a manifold block portion 102 formed as an integral part of the cap 92. As shown in FIG. 3, block portion 102 is of rectangular configuration and is provided with a number of bores or passageways therethrough. These passageways or bores are interconnected with one another so as to provide a hydraulic pressure transmitting system functioning in the manner shown in FIG. 1. The various bores are given corresponding reference numerals to the conduits previously described. The various bores extend inwardly from various faces of the manifold block 102, as by suitable machining operations.

One advantage in utilizing a manifold block construction as shown in FIG. 3 resides in the fact that the various passages are interconnected with one another without external joints which might tend to leak at high pressures. The use of a manifold is further advantageous in the servicing of the apparatus. Thus, in the event that one or more of the various check valves are suspected as leaking, the entire assembly shown in FIG. 4 (or cap 92) can be replaced without testing the individual check valves. The total cost of manufacture of the manifold block check valve assembly is greater than the cost of one individual check valve assembly but in practice additional costs arise because time is consumed in locating the leaky check so that in the overall cost picture the manifold block construction has considerable advantage.

The construction of each individual check valve may be varied. However for illustration purposes there is shown in FIG. 5 a check valve assembly including a seat-forming disk 110 and steel sleeve 112, said sleeve being utilized for wear purposes when the manifold block is formed of aluminum or other soft material.

Slidably positioned within sleeve 112 is a plunger 114 having flats, as at 116, FIGURE 6, for passage of fluid there-past when the carried O-ring seal 118 is spaced from disk 110. The steel sleeve is locked within the manifold block by a nut 120, and an internally threaded collar 122 is interposed between the nut and sleeve to form a mount for an adjustable spring seat element 124.

Element 124 includes a hollow externally threaded tubular portion 126 engageable with collar 122, and a disk portion 128 engageable with compression spring 130. By turning element 124 it is possible to adjust the loading on spring 130 and the crack-open pressure of the valve.

Referring again to FIG. 1, it will be seen that the illustrated arrangement is of advantage in that it permits the tester to be tested for internal leakage. Thus, with valves 32 and 44 closed, and pressure developed within the tester, a leak from line 12 through check 14 will be indicated by a clockwise deflection of needle 22. A leak from line 18 through check 20 will be indicated by a counterclockwise deflection of needle 22. A leak through the valving at 44, 50 and 54 may be indicated by movement of the static gage needle without change in the position of needle 22.

It is believed that with the above description and illustration features of the invention will be apparent. For a definition of the scope of the invention reference should be had to the appended claims.

We claim:

1. In a hydraulic leakage detection system, a pressure differential indicator, first conduit means adapted to supply fluid pressure to one side of said indicator, second conduit means adapted to supply fluid pressure to the other side of said indicator, third conduit means for supplying said first and second conduits with pressure fluid from a source of same, means for placing said second conduit in communication with a system to be checked for leakage, a fourth conduit connecting said first and second conduits in by-passing relation to said indicator, valve means in said fourth conduit to control flow therethrough, and valve means in said first and second conduits preventing back-flow to said third conduit.

2. In a leakage detection mechanism the combination comprising a pressure differential indicator; a first conduit means for applying one pressure to the indicator; a second conduit means for applying an opposing pressure to the indicator; means operative to place the second conduit means in fluid communication with the work to be tested for leakage; a third conduit means for supplying pressure fluid to both of said first and second conduit means; a first check valve in the first conduit means preventing backflow to the third conduit means; and a second check valve in the second conduit means preventing backflow therethrough to the third conduit means.

3. In a leakage detection mechanism the combination comprising a pressure differential indicator; a first conduit connected with the indicator to supply same with pressure fluid; a second conduit connected with the pressure indicator to supply same with pressure fluid opposing the first pressure fluid; a pressure fluid source; a third conduit means between said source and the first and second conduits whereby to establish substantially equal pressures in the conduits; a first check valve preventing backflow from the first conduit into the third conduit; a second check valve preventing backflow from the second conduit into the third conduit; a third check valve preventing backflow from the third conduit into the source; and an accumulator for storing pressure within the first conduit.

4. In a leakage detection mechanism the combination comprising a pressure differential indicator; a pressure applying system including a first conduit for supplying pressure fluid to said indicator, and a second conduit for supplying an opposing fluid pressure to the indicator; a fluid pressure source; a third conduit connecting said source with each of the first and second conduits in the applying system; first valves preventing backflow from the first and second conduits to said third conduits; a second valve in said third conduit preventing backflow from the applying system to said source; means for placing the second conduit in fluid communication with the work to be tested for leakage; and a static pressure gage in fluid communication with said third conduit, whereby pressure fluid may be delivered from the source to the applying system and work, to establish a test pressure as denoted by the static gage, after which any loss in pressure in the work may be detected by pressure imbalance occurring across the first and second conduits as indicated by the reading on the pressure differential indicator.

5. The combination of claim 4 and further comprising a fourth conduit interconnecting the first and second conduits, and valve means in said fourth conduit openable to enable the pressures in the first and second conduits to bypass the pressure differential indicator during the admission of pressure fluid into the applying system.

6. The combination of claim 4 and further comprising a valved conduit structure extending between the first and second conduits operative to isolate the first conduit from the second conduit when the pressure differential thereacross is below a predetermined value, but effective on pressure differentials above said predetermined value to place the first and second conduits in communication with one another so as to prevent overload on the pressure differential indicator.

7. The combination of claim 6 wherein the valved conduit structure comprises a line and a check valve loaded to open when the pressure differential rises above the aforementioned predetermined value.

8. In a leakage detector mechanism, the combination comprising a pressure differential indicator and a unitary multi-faced manifold block and pump associated therewith, said block being hollowed to define a first passage extending from a block face to receive fluid from the pump, a second passage extending from a block face and into connection with said first passage, a conduit extending from a block face into connection with said second passage to direct fluid from the first passage via the second passage to one side of the indicator, a conduit extending from a block face into connection with said second passage to direct fluid from the first passage via the second passage to the other side of the indicator, and a conduit extending from a block face into connection with said second passage to direct fluid from the first passage via the second passage and to the work to be tested, a check valve in said first passage preventing back-flow therethrough, and a check valve in said second passage preventing back-flow therethrough to said first passage.

9. The combination of claim 8 wherein the pump comprises a cylinder means extending directly from the manifold block.

10. The combination of claim 9 wherein the cylinder means comprises a first piston-reception portion of relatively small internal diameter and a second piston-receptor portion of relatively large internal diameter.

11. In a leakage detection system,
a fluid pressure differential indicator having two sides,
a source of pressurized fluid,
conduit means connected to supply pressurized fluid from said source to each side of said indicator,
a conduit connected to one side of said indicator to admit pressurized fluid to work to be tested,
check valve means in said conduit means preventing reverse flow from each side of said indicator and from the work back to said means to said source,
and a separate valved conduit connected directly across the two sides of said differential indicator.

12. In a leakage detection system,
a fluid pressure differential indicator having two sides,
a source of pressurized fluid,
conduit means connected to supply fluid from said source to each side of said indicator,
a valved conduit connected to one side of said indicator to admit pressurized fluid to work to be tested,
check valve means in said conduit means preventing reverse flow from each side of said differential indicator and the work to be tested back to said source,
a separate valved conduit connected across the two sides of said differential indicator,
and said source of pressure fluid comprising,
a reservoir,
and pumping mechanism operable to move fluid from said reservoir into said conduit means at test pressure.

13. In a combination pump-manifold,
a block having a surface,
a large cylinder fastened to said surface,
a small cylinder formed in said surface coaxial to said large cylinder,
pistons slidable in said cylinders and connected by a rod,
fluid means for actuating said large piston to thereby move said small piston and produce multiplied pumping pressure in said small cylinder,
a first port in said block connected to said small cylinder above said small piston,
a first conduit in said block connected to said first port,
a pressure differential indicator having two sides,
second and third ports in said block connected via fluid conduits to said first conduit to supply fluid to both sides of said pressure differential indicator,
check valve means in the fluid conduits of said second and third ports preventing reverse flow from said pressure differential indicator back to said first conduit,
a fourth port in said block connected via fluid conduit means to said first conduit to supply fluid to work to be tested,
check valve means in the fluid conduit means of said fourth port preventing reverse flow from the work back to said first conduit,
and fifth and sixth ports in said block connected via fluid conduits to said indicator supply ports,
and a valved conduit connected directly across said fifth and sixth ports.

References Cited in the file of this patent
UNITED STATES PATENTS

| | | |
|---|---|---|
| 1,368,147 | Hennebohle | Feb. 8, 1921 |
| 1,381,562 | Jones | June 14, 1921 |
| 2,100,092 | Tear | Nov. 23, 1937 |
| 2,796,757 | Peterson | June 25, 1957 |
| 2,847,851 | Enell | Aug. 19, 1958 |
| 2,874,566 | Mastak | Feb. 24, 1959 |
| 2,921,431 | Sampietro | Jan. 19, 1960 |
| 2,924,971 | Schroeder et al. | Feb. 16, 1960 |
| 2,936,611 | Le Mat et al. | May 17, 1960 |
| 2,939,314 | Prince | June 7, 1960 |